United States Patent [19]
Weber et al.

[11] Patent Number: 5,518,556
[45] Date of Patent: May 21, 1996

[54] SURFACE-HARDENED OBJECTS OF ALLOYS OF PLATINUM AND PALLADIUM AND METHOD FOR THEIR PRODUCTION

[75] Inventors: Wolfgang Weber, Karlstein am Main; Klaus Zimmermann, Alzenau; Hans-Hermann Beyer, Kahl, all of Germany

[73] Assignee: Degussa Aktiengesellschaft, Frankfurt am Main, Germany

[21] Appl. No.: 212,996

[22] Filed: Mar. 15, 1994

[30] Foreign Application Priority Data

Apr. 23, 1993 [DE] Germany ............... 43 13 272.3

[51] Int. Cl.$^6$ ........................................ C22C 5/00
[52] U.S. Cl. ........................ 148/430; 420/466
[58] Field of Search ............... 420/466, 467, 420/468; 148/279, 239, 901, 902, 430

[56] References Cited

U.S. PATENT DOCUMENTS

| | | | |
|---|---|---|---|
| 4,828,933 | 5/1989 | McGill et al. | 148/430 |
| 4,960,647 | 10/1990 | Grundy | 148/279 |

FOREIGN PATENT DOCUMENTS

| | | | |
|---|---|---|---|
| 0101936 | 3/1984 | European Pat. Off. | 148/279 |
| 586622 | 10/1993 | Germany . | |
| 0081646 | 7/1981 | Japan | 420/466 |
| 0104467 | 6/1984 | Japan | 148/430 |

OTHER PUBLICATIONS

Patent Abstracts of Japan, Nov. 13, 1991, vol. 15, No. 445, Surface Hardened Color Platinum Alloy.

Chemical Abstract, Sep. 6, 1982, vol. 97, No. 10, p. 312, Bronzing Metals.

Patent Abstracts of Japan, Jun. 25, 1982.

Chemical Abstracts, Apr. 30, 1979, vol. 90, No. 18.

Patent Abstracts of Japan, Dec. 6, 1984, vol. 8, No. 266.

Derwent Database WPI, Aug. 16, 1991, Seiko Instruments Inc.

Derwent Database WPI, Mar. 14, 1990, Tractor Comb Motors.

*Primary Examiner*—Scott Kastler
*Attorney, Agent, or Firm*—Beveridge, DeGrandi, Weilacher & Young

[57] ABSTRACT

Hard and scratch-proof objects of platinum and palladium or their alloys comprise a boron-containing surface layer which is 20 to 500 μm thick and contains 0.3 to 1.5% by weight boron embedded in the metal lattice.

9 Claims, No Drawings

SURFACE-HARDENED OBJECTS OF ALLOYS OF PLATINUM AND PALLADIUM AND METHOD FOR THEIR PRODUCTION

INTRODUCTION AND BACKGROUND

The present invention relates to objects fabricated of platinum and palladium which are provided with a hard and scratch-proof surface layer containing boron. The platinum can be alloyed with up to 25% by weight other noble and base metals and the palladium can be alloyed with up to 65% by weight of other noble metals and up to 15% by weight base metals. In a further aspect, the present invention also relates to a method of producing such fabricated objects.

Fabricated articles and objects consisting of platinum and platinum alloys play an increasingly greater role, particularly in the jewelry trade. Palladium alloys are also increasingly used for scientific technical purposes. Pure platinum and pure palladium are very soft and can not be brought up to very high hardness values even by adding other noble and base metals to form alloys thereof without losing other characteristic properties. In the case of rings or watch-cases, this deficiency results in the surfaces of such articles being easily scratched.

Hardness values of up to approximately 300 kp/mm$^2$ can be achieved by adding e.g. iron, cobalt, boron or silicon in an alloying method using metallic fusion, at which time intermetallic phases develop which are important for attaining the hardness.

EP-OS 0,274,239 teaches scratch-proof platinum objects wherein elements such as aluminum, chromium, titanium or zirconium are allowed to diffuse into the surface of the object to form intermetallic compounds such as $PtAl_4$, $Pt_3Al$ or $Pt_2Al_3$ in the surface layer. Boron is cited, among others; however, no examples or method parameters are indicated. The formation of intermetallic compounds does bring about an increase of hardness in the surface layer but has the disadvantage that a heterogeneous, multiphase structure is obtained with non-uniform properties. Moreover, relatively high concentrations of the metal diffusing into the surface layer are necessary in order to achieve the desired hardness effects. As a result thereof, such objects are not capable of being hallmarked in the jewelry trade.

SUMMARY OF THE INVENTION

It is an object of the present invention to provide fabricated articles of platinum and palladium having a hard and scratch-proof surface layer containing boron and in which the platinum can be alloyed with up to 25% by weight other noble metals and base metals and the palladium can be alloyed with up to 65% by weight of other noble metals and up to 15% by weight base metals. These proportions are not narrowly critical and can vary by a few percent. No large amounts of boron should diffuse into the surfaces thereby, so that the objects remain capable of being hallmarked for the jewelry trade.

In attaining the above and other objects, a feature of the invention resides in forming a homogenous structure in the surface layer of the article.

In carrying out the present invention, the platinum alloys and palladium alloys have formed thereon a hardened surface layer that is 20 to 500 μm thick and contains 0.3 to 1.5% by weight boron which is embedded to a very large extent in the metallic lattice.

According to the invention, it is preferable if the hardened surface layer is 30 to 250 μm thick and contains 0.4 to 1%, most preferably 0.5 to 0.9% by weight boron.

It is decisive for the desired hardening effect to be obtained according to the present invention that no intermetallic compounds develop between the boron and the platinum group metals and/or the other alloying metals in the surface. Instead, the boron atoms are inserted into the metallic lattice, preferably with the formation of interstitial mixed crystals. Although no intermetallic compounds are produced, an alloy of extraordinarily high hardness is obtained in this surface layer.

A further feature of the present invention resides in a method for the production of these boron-containing, hardened platinum-and palladium layers by treating the objects with boron-releasing compounds at rather high temperatures. The fabricated objects are preferably heated in a mixture of a boronizing agent, an activator and, optionally, an inert substance at temperatures from 500° C. to the melting point of the corresponding platinum- boron- and/or palladium-boron eutectic until a surface layer of 20 to 500 μm exhibits a boron content of 0.3 to 1.5% by weight.

It is preferable if the mixture used for treating the fabricated objects contains 70 to 95% by weight amorphous boron and/or boron carbide as the boronizing agent and 5 to 30% by weight potassium boron fluoride as activator and up to 50% by weight of an inert substance can be added to this mixture. For example, aluminum oxide can serve as the inert substance.

DETAILED DESCRIPTION OF INVENTION

Further details of the present invention will now be described. In carrying out the invention any suitable form of the boronizing agent can be used according to what is most convenient for treating the fabricated article. Therefore, the boronizing mixture can be used as powder or also as paste. However, it is also possible to use gaseous boronizing agents or boron-releasing molten salt baths.

Examples of boronizing mixtures include those containing from 20% to 95% amorphous boron, 5 to 20% potassium boron fluoride, 0 to 50 boron carbide, 0 to 30 boron nitride, 0 to 50% $Al_2O_3$. When amorphous boron is not used boron carbide and/or boron nitride can be used in its place.

The boronizing treatment according to the invention of platinum or platinum alloys for surface-hardening must take place below the Pt-B eutectic at 790° C., preferably at 750° C. with a high boron supply. A boronizing treatment with high boron supply at temperatures above 790° C. results in meltings and in the formation of platinum-boron phases. The diffusing in of boron at temperatures below 790° C. brings about an elevation of the intrinsic tension in the platinum and therewith an increase in strength and hardness. The hardened surface layer contains only very little boron in solid solution (up to 1.5%). The hardness achieved is a function of the amount of the boron diffused in and of its distribution in the metal lattice. This distribution can be controlled via the working temperature of the heat treatment of the invention. The boron supply in the boronizing mixture can be influenced via the content of inert substance.

The time of the boronizing until the desired boron content is achieved in the desired layer thickness can be readily determined by means of simple tests known to those skilled in the art. Typical times for small jewelry items are 3 to 5 hours.

A mixture of amorphous boron as boron donor, aluminum oxide as inert substance and potassium boron fluoride (KBF$_4$) as activator is the best-suited for the boronizing of platinum or platinum alloys and palladium or palladium alloys. Using suitable treatment containers such as annealing boxes with a steel cover, the objects can be packed into this powder mixture and then heated for 1 to 5 hours in a furnace. The mixture can also be worked into a binder system consisting of binder and solvent into which system the parts are immersed. The adhering suspension is first dried. Then, the coated parts are annealed in the furnace. If the annealing is performed in air, the parts must be packed in very carefully (1 cm powder charge over the parts) or coated (2–3 mm dried suspension), otherwise, the annealing should take place under protective gas, such as argon or hydrogen (no N$_2$ on account of the formation of boron nitride) to prevent contact of the article by air. The annealing temperature depends on whether the work is performed with pure platinum or with platinum alloys. Pure platinum and platinum/cobalt alloys are annealed at temperatures below 790° C., preferably at 700° C. Platinum/tungsten alloys and platinum/copper alloys are annealed at temperatures below 790° C., preferably at 750° C. After the furnace as cooled off, the parts are removed from the annealing box and cleaned of adhering powder with a brush. The loose powder can be reused after the addition of KBF$_4$ (approximately 10% by weight). Parts which were coated with a suspension have a hard, adhering layer of sintered-together [agglomerated] powder after the annealing process which must be carefully removed.

Instead of amorphous boron, fine-particle size (<40 μm) boron carbide and boron nitride can also be used, which latter makes it more difficult for the powder mixture to cake together.

When palladium and palladium alloys are hardened, it is preferable to work at temperatures from 850° to 900° C.

The following examples are intended to explain the invention in detail:

EXAMPLE 1

15 g of a mixture of 85 g boron$_{(amorphous)}$ and 15 g KBF$_4$ are placed in an annealing box of special steel (5×5×5 cm). A chain of platinum alloy Pt850/Co150 is then placed into the loose boronizing powder. The chain is then covered further with 15 g boronizing powder and the powder mixture firmly tamped. The annealing box is then closed with a cover with a projecting edge and placed in a furnace. The annealing treatment takes place for 5 hours at a temperature of 750° C. Thereafter, the chain links have a boronized diffusion zone approximately 250 μm thick with a hardness of approximately 730 kg/mm$^2$ at a boron content of approximately 0.8% by weight.

EXAMPLE 2

10 g of a mixture of 90 g boron$_{(amorphous)}$ and 10 g KBF$_4$ are placed in an annealing box of special steel (5×5×5 cm). A watch-case of platinum alloy Pt 950/W50 is then placed in the loose boronizing powder. The watch-case is then covered with a further 10 g boronizing powder and the powder mixture firmly tamped. The annealing box is then closed with a cover with a projecting edge and placed in a furnace. The annealing treatment takes place for 3 hours at a temperature of 780° C. Thereafter, the watch-case has a boronized diffusion zone approximately 150 μm thick with a hardness of approximately 680 kp/mm$^2$ at a boron content of approximately 0.85% by weight in the diffusion zone.

EXAMPLE 3

5 g of a mixture of 80 g boron$_{(amorphous)}$ and 20 g KBF$_4$ are placed in an annealing box of special steel (5×5×5 cm). A ring of platinum alloy Pt960/Cu40 is then placed into the loose boronizing powder. The ring is then covered with a further 5 g boronizing powder and the powder mixture firmly tamped. The annealing box is then closed with a cover with a projecting edge and placed in a furnace. The annealing treatment takes place for 5 hours at a temperature of 760° C. Thereafter, the ring has a boronized diffusion zone approximately 150 μm thick with a hardness of approximately 700 kg/mm$^2$ at a boron content of approximately 0.9% by weight.

EXAMPLE 4

A ring (approximately 5 g) of the alloy Pt900/Ni100 is immersed into a suspension of 270 g boron$_{(amorphous)}$, 30 g KBF$_4$, 15 g polyisobutylene and 200 g light gasoline. After it has been drawn out, the adhering suspension (approximately 5 g) is dried at 80° C. The annealing treatment takes place at 750° C. for 3 hours. After cooling off, the layer, which is firmly baked on, is carefully removed. The ring has a boron diffusion layer approximately 100 μm thick with a hardness of approximately 710 kp/mm$^2$ at a boron content of approximately 1.0% by weight.

EXAMPLE 5

A ring (approximately 5 g) of the alloy Pt950/Co50 is immersed into a suspension of 150 g aluminum oxide, 135 g boron$_{(amorphous)}$, 15 g KBF$_4$, 15 g polyisobutylene and 200 g light gasoline. After it has been drawn out, the adhering suspension (approximately 5 g) is dried at 80° C. The annealing treatment takes place at 750° C. for 5 hours. After cooling off, the layer, which is firmly baked on, is carefully removed. The ring has a boron diffusion layer approximately 180 μm thick with a hardness of approximately 480 kp/mm$^2$ at a boron content of approximately 0.6% by weight.

EXAMPLE 6

5 g of a mixture of 100 g Al$_2$O$_3$, 90 g boron$_{(amorphous)}$ and 10 g KBF$_4$ are placed in an annealing box of special steel (5×5×5 cm). A platinum ring Pt999 is then placed into the loose boronizing powder. The ring is then covered with a further 5 g boronizing powder and the powder mixture firmly tamped. The annealing box is then closed with a cover with a projecting edge and placed in a furnace. The annealing treatment takes place for 5 hours at a temperature of 750° C. Thereafter, the ring has a boronized diffusion zone approximately 250 μm thick with a hardness of approximately 500 kg/mm$^2$ (boron content approximately 0.65% by weight).

EXAMPLE 7

10 g of a mixture of 50 g B$_4$C, 30 g BN and 20 g KBF$_4$ are placed in an annealing box of special steel (5×5×5 cm). A watch-case of platinum alloy Pt950/W50 is then placed into the loose boronizing powder. The watch-case is then covered with a further 10 g boronizing powder and the powder mixture firmly tamped. The annealing box is then closed with a cover with a projecting edge and placed in a furnace. The annealing treatment takes place for 3 hours at a temperature of 780° C. Thereafter, the watch-case has a boronized diffusion zone approximately 150 μm thick with a hardness of approximately 450 kg/mm$^2$ at a boron content of approximately 0.5% by weight.

EXAMPLE 8

10 g of a mixture of 20 g boron$_{(amorphous)}$, 40 g B$_4$C, 30 g BN and 10 g KBF$_4$ are placed in an annealing box of special steel (5×5×5 cm). A watch-case of platinum alloy Pt900/Pd100 is then placed into the loose boronizing powder. The watch-case is then covered with a further 10 g boronizing powder and the powder mixture firmly tamped. The annealing box is then closed with a cover with a projecting edge and placed in a furnace. The annealing treatment takes place for 3 hours at a temperature of 750° C. Thereafter, the watch-case has a boronized diffusion zone approximately 150 μm thick with a hardness of approximately 550 kg/mm$^2$ (boron content approximately 0.7% by weight).

EXAMPLE 9

An object of pure palladium is embedded as in the previous examples in a mixture of 90 g amorphous boron and 10 g potassium boron fluoride and heated 5 hours at 800° C. A hardened layer of 150 μm is obtained with a hardness of 560 kp/cm$^2$ (boron content approximately 0.65% by weight).

EXAMPLE 10

Objects of a palladium alloy with 80% by weight palladium, 6% by weight copper, 7% by weight tin and 7% by weight gallium are packed in a mixture of 50 g amorphous boron, 10 g potassium boron fluoride, 20 g boron carbide and 20 g boron nitride and heated 4 hours at 830° C. A hardened layer of 100 μm is obtained with a hardness value of 450 kp/cm$^2$ (boron content approximately 0.45% by weight).

EXAMPLE 11

Objects of a palladium alloy with 54% by weight silver portion are packed in a mixture of 90 g amorphous boron and 10 g potassium boron fluoride and heated 3 hours at 800° C. Layer thickness approximately 60 μm with a hardness of 380 kp/cm$^2$ (boron content approximately 0.4% by weight).

EXAMPLE 12

Objects of an alloy of 40% by weight palladium, 44% by weight silver, 11% by weight germanium and 5% by weight indium are heated to 800° C. in a mixture of 70 g amorphous boron and 10 g each of boron carbide, boron nitride and potassium boron fluoride for 5 hours. A hardened layer of approximately 100 μm is obtained with a hardness of 400 kp/cm$^2$ (boron content approximately 0.4% by weight).

As can be seen from the above examples, the range of thickness of the protective surface layer is from 380 to 730 kg/mm$^2$.

In addition to pure platinum, numerous alloys of platinum with other noble metals and/or base metals can be treated in accordance with this invention. Similarly, pure palladium articles as well as palladium alloys with other noble metals and/or base metals can be treated according to the invention. The above examples mention a few; e.g. Co, W, Cu, Ni, Sn, Ga, Ag, Ge and In.

Further variations and modifications of the foregoing will be apparent to those skilled in the art and are appended hereto.

German priority application P 43 13 272.3 is relied on and incorporated herein.

We claim:
1. An article made from a platinum group metal material selected from the group consisting of platinum, palladium and alloys thereof with noble metals and with base metals provided with a hard and scratch-proof homogenous surface layer containing 0.3 to 1.5% by weight boron which is embedded in the metallic lattice, there being no intermetallic compounds between boron and said platinum group metal.

2. The article according to claim 1 wherein said platinum alloy contains 0 to 25% by weight noble and base metals and said palladium alloy contains 0 to 65% by weight of other noble metals and 0 to 15% by weight base metals.

3. The article according to claim 1 wherein said hard surface layer is 20 to 500 μm thick.

4. The article according to claim 1, wherein the hard surface layer is 30 to 250 μm thick.

5. The article according to claim 1 wherein the surface layer contains 0.5 to 0.9% by weight boron.

6. The article according to claim 1 wherein the surface contain 0.4 to 1% boron.

7. The article according to claim 1 which is a ring, chain or other items of jewelry.

8. The article according to claim 1 wherein said boron is present in solid solution in said lattice.

9. The article according to claim 1 wherein said surface layer is a homogenous structure with no intermetallic compounds of boron.

* * * * *